Patented July 7, 1925.

1,545,320

UNITED STATES PATENT OFFICE.

JOHN C. HEBDEN, OF NEW YORK, N. Y., ASSIGNOR TO HEBDEN SUGAR PROCESS CORPORATION, OF NEW YORK, N. Y., A CORPORATION OF NEW YORK.

METHOD OF REGENERATING SUGAR-PURIFYING REAGENTS.

No Drawing. Application filed October 28, 1922. Serial No. 597,681.

*To all whom it may concern:*

Be it known that I, JOHN C. HEBDEN, a citizen of the United States, residing at New York, in the county of New York and State of New York, have invented certain new and useful Improvements in Methods of Regenerating Sugar-Purifying Reagents, of which the following is a specification.

The present invention relates to the art of purifying sugar juices and sugar solutions and its primary object is to provide a novel method of re-generating the purifying re-agents or activated substances used, whereby these re-agents, or a substantial portion thereof, will be rendered available for re-use and the impurities taken up or removed from the sugar juice or solution by the purifying re-agents, are removed in solution, so that they do not appear as insoluble precipitates or filter cakes which require expensive or otherwise objectionable modes of disposal.

The invention is especially applicable to purifying re-agents comprising activated substances or substrates carrying such activated substances of the kinds described in my prior applications Serial No. 466,493, filed May 3, 1921, and Serial No. 512,074, filed November 1, 1921, such re-agents being used to take up or remove the impurities from the sugar juice and comprise an activated substance or dye mordant, or an insoluble base on which is deposited such activated substance or mordant which takes up or removes the impurities from the sugar juice or solution. The present invention provides a method of re-generating such activated substances and substrates, thus enabling the re-use of the activated substance or mordant and also of the substrate itself, thereby effecting a substantial saving in material and labor.

The present invention is applicable to the re-generation of activated substances or mordants and substrates of various kinds which have been used to take up or remove the impurities from sugar juices or solutions. It is, as previously stated, applicable to all of the activated substances and substrates described in my prior applications above noted. For example, the activated substance or mordant may comprise an insoluble basic compound consisting of any of the insoluble hydroxides or tannates of metals, preferably the hydroxides or tannates of iron, alumina or titanium, the insoluble ferro cyanides and the insoluble ferri cyanides, or the insoluble sulfo cyanides; or the activated substance or mordant may consist of a synthetic animal fibre or a synthetic substance having the same affinity or capacity for absorbing basic dye stuffs, as does wool, leather, protein and similar substances, as for example, an insoluble compound or precipitate of a gelatine or similar nitrogenous substance which can be rendered soluble and thus precipitated by various inorganic compounds, such as salts of chromium, iron or alumina, or by organic compounds, as for example, tannic acid or those bodies which are classed under the generic or comprehensive term tannin, or formaldehyde or similar substances, as well as the synthetic or manufactured products which can be used for tanning hides to produce leather, as for example, sulfonic acids of the aromatic hydrocarbons or other substituted compounds, or the condensation products derived from these, either with or without the use of formaldyhyde or similar condensing agents. Also the products derived from the sulfite waste liquors of the sulfite wood pulp manufacture industry, commercially known as "lignone," sulfite waste and similar denominations may be used as precipitating re-agents to produce the insoluble glue, gelatine or protein compounds. Any one or more of these re-agents can be prepared substantially as described in my prior application Serial No. 466,492, to produce an insoluble activated substance or mordant, either by itself or on an insoluble base or substrate, and the activated substance or mordant, or the activated substrate thus produced can be used substantially in accordance with the methods described in my above-mentioned applications, to take up or remove the impurities from the sugar juice or solution.

The substrate itself may consist of any of those referred to in my above-mentioned applications. For example, it may comprise an insoluble base, such, for instance, as fuller's earth, kaolin or china clay, ground silica, dry alumina hydrate of the kind insoluble in water, kieselguhr or infusorial earth, ground wood or wood flour, or any other finely divided substance which is insoluble in water and upon which the activated substance or mordant can be precipitated. It is particularly advantageous, however, to employ bagasse in a finely divided condition, owing to its porous or spongy nature and the fact that it can be readily prepared and can be readily removed from the sugar juice.

These activated substrates, when used, may be prepared substantially as described in my prior application Serial No. 466,493. For example, in preparing a substrate carrying an insoluble tannate as an activated substance or mordant, the procedure may be substantially as follows:

To a suspension of bagasse, infusorial earth or any other suitable insoluble, finely divided substance is added the salt of the metal, the insoluble tannate of which is to be produced. Where, for instance, the insoluble tannate of alumina is to be produced, there is added to the suspension sufficient sulfate of alumina to precipitate in and on the substrate, say one-fourth of one per cent of the weight of the sugar to be treated, of alumina hydroxide. The precipitation is performed preferably hot by sodium carbonate or any alkali which will transpose alumina sulfate and precipitate the hydroxide, leaving a soluble sulfate. A solution of tannic acid or any suitable tannin is then added to the substrate upon which the hydroxide is precipitated, the amount of tannic acid or tannin added being sufficient to combine with all or a part of the hydroxide. The insoluble tannate thus produced is then washed with hot water to remove all products soluble therein, then filter-pressed and is then ready for use. The procedure for the preparation of other insoluble tannates, such as the tannates of iron and titanium would be the same as that for the tannate of alumina. Some insoluble tannates can be produced by adding to the substrate the salt of the metal whose tannate is required and adding to this mixture the tannic acid or tannin, thus precipitating the insoluble tannate.

In preparing a substrate containing an activated substance or mordant above designated as synthetic animal fibre, the procedure may be substantially as follows:

To a suspension of bagasse, infusorial earth or any finely divided substance insoluble in water, there is added one-fourth of one per cent of the amount of sugar to be treated, or a good quality of glue or other protein or nitrogenous substance. To this mixture, when of a temperature at or near the boiling point of water, there is added sufficient tannic acid, tannin or any of the substances enumerated in the foregoing description of the so-called synthetic animal fibre to coagulate or precipitate the gelatine or glue substance. The compound thus formed can then be washed with water until all of the material soluble therein is removed, or it can be treated with the salt of a metal, as for instance, aluminum sulfate, in order to harden the compound formed as above described; or the compound may be treated with the salt of a metal, as for instance, aluminum sulfate in excess, in order to harden the product as described, and the excess of the compound thus used for hardening can be precipitated as hydroxide. The above-described hardened compound plus the hydroxide may also be treated with tannin or the other substances enumerated above in describing the synthetic animal fibre.

The impurities taken up by the activated substance or mordant, or the activated substrate when used for the purification of a sugar juice or syrup, consist, as explained in my prior above-mentioned applications, of colors or dye stuffs, either mordant dyeing or basic, or both, vegetable gums and similar compounds, nitrogeneous, albuminous or protein substances which, however, are found chiefly in raw juices, and tannates, polyphenols and weak acids.

I have discovered that part of these impurities taken up and removed from the sugar juices or solutions by the mordant or the activated substrate may be removed from the mordant or activated substrate by treatment with a hydrolyzing re-agent which will render these impurities soluble and will have very little, if any, reaction with the dye mordant or activated substrate. These hydrolyzable impurities appear to be gums, polyphenols and similar bodies. This reaction does not appear to render soluble the albuminous substances. I have found that these impurities are easily hydrolyzed or rendered soluble by the action of an acid reacting substance, such as a weak solution of one of the mineral acids, say sulfuric acid or muriatic acid, used in such a strength that they have no appreciable action upon the tannin compound of the metal used or upon the synthetic tannin gelatine compound or the other compound used for purifying the juice. If a strong solution of acid is used, the hydroxides of the metal which is combined with the tannin may be dissolved and the dye mordant or activated substance may be decomposed. It is, therefore, desirable to avoid the use of strong solutions of the acids.

I have also found that the salts of iron, titanium and alumina, particularly ferric sulfate, aluminum sulfate and titanium sulfate may be used as a hydrolyzing agent. When these compounds are used there is little danger of decomposing the dye mordant or activated substance, so that a larger quantity of these salts may be used in solution, without injurious effect or decomposing action upon the dye mordant or the activated substance. The advantage in using the salts of the metals, as mentioned above, lies in the fact that after the impurities have been hydrolyzed and rendered soluble, these compounds may be decomposed with an alkali and precipitated as hydroxide and are thus available for reconstructing the dye mordant or activated substance. This applies both to the dye mordant made as tannates of metals and to the synthetic fibre or similar nitrogenous substances. It also applies to the insoluble ferro or ferri cyanides and sulfo cyanides.

In re-generating by this method, a dye mordant or activated substance which consists wholly of insoluble hydroxide of a metal, say ferric hydroxide, aluminium hydroxide or titanium hydroxide, the impurities are rendered soluble and the hydroxide may be completely recovered by neutralizing with an alkali the acid or salt of the metal which reacts as an acid to recover the hydroxide which may be dissolved in the acid solution.

In applying this method for re-generation, the following procedure may be adopted: The dye mordant or activated substrate carrying the impurities which have been fixed thereon and absorbed in the process of purification of the sugar products is suspended in boiling water, to which has been added or may be added sufficient mineral acid to hydrolyze the impurities or sufficient of the salt of a metal which will react as a weak acid to perform the same hydrolyzation. As the amount of the impurities to be hydrolyzed varies, the strength of the acid or salt solution used may be varied accordingly, trial showing in each case whether the acid or salt solution is too strong. If the acid or salt solution is too weak, some of the impurities will be left unhydrolyzed, and if it is too strong, some of the activated substance will be decomposed. The whole mixture is boiled and the product may be filtered and washed and is then ready for re-use, or the acid solution may be neutralized before washing and filtering, or the acid or the neutral solution may be treated with a small percentage of the original amount of tannic acid used for making the original dye mordant or substrate, and the product thus obtained may be filtered and washed and is then ready for re-use.

In practice, it is found that there is a slight decomposition of the dye mordant or active substance and that this is more appreciable in the tannates of the metals than in the synthetic fibre or insoluble compound of gelatine or similar nitrogenous substance and that it is, therefore, advisable in practice to add a small percentage, say 10 or 15% of the amount of tannic acid that would be originally employed for making the dye mordant or activated substance, in order to get the highest efficiency in the recovered or re-generated dye mordant or activated material.

I claim as my invention:—

1. The herein described method of regenerating activated substances comprising a basic compound insoluble in water and used in the purification of cane sugar juices which comprises hydrolyzing the impurities taken up by the activated substance from the sugar juice, and washing out the hydrolyzed impurities.

2. The herein described method of re-generating activated substances comprising a basic compound insoluble in water and used in the purification of cane sugar juices which comprises hydrolyzing the impurities taken up by the activated substance from the sugar juice, washing out the hydrolyzed impurities, and rendering the recovered activated substance neutral.

3. The herein described method of regenerating purifying re-agents comprising mordants insoluble in water and capable of fixing basic and mordant-dying dyestuffs and used in the purification of cane sugar juices which comprises treating such re-agents with an acid reacting substance to hydrolyze impurities taken up thereby from the sugar juices.

4. The herein described method of re-generating activated substances comprising a basic compound insoluble in water and used in the purification of sugar juices which comprises treating such activated substance with an acid reacting substance having a strength sufficient to hydrolyze impurities taken from such juices but not sufficient to substantially decompose the activated substances.

5. The herein described method of regenerating activated substances comprising a basic compound insoluble in water and used in the purification of sugar juices which comprises treating such activated substance with an acid reacting substance to hydrolyze impurities taken up thereby from the sugar juices, and washing out the hydrolyzed impurities.

6. The herein described method of regenerating activated substances comprising a tannin compound insoluble in water and used in the purification of sugar juices which comprises treating such activated substance with an acid reacting substance to hydrolyze the impurities taken up thereby from the sugar juice, washing out the hydrolyzed impurities, and treating the recovered activated substance to render it neutral.

7. The herein described method of regenerating activated substances containing a tannin compound insoluble in water and used in the purification of sugar juices which comprises treating such activated substance carrying the impurities taken up thereby from the sugar juice with an acid reacting substance to hydrolyze the impurities, washing out the soluble hydrolyzed impurities, treating the insoluble product with tannin to regenerate the active substance, and recovering the precipitate thus formed.

8. The herein described method of regenerating activated substances embodying a precipitated basic compound insoluble in water and used in the purification of sugar juices which comprises treating the used activated substance carrying the impurities taken up by it from the sugar solution with a hydrolyzing agent to hydrolyze the impurities carried thereby, removing the hydrolyzed impurities from the activated substance, and adding to the recovered activated substance an amount of precipitating and activating substance to make up for loss of activated substance due to decomposition of the activated substance treated.

In testimony whereof I have hereunto set my hand.

JOHN C. HEBDEN.